J. D. RUSS.
DEVICE FOR SECURING COUPLINGS TO FLEXIBLE HOSE.
APPLICATION FILED JUNE 27, 1918.
1,296,222.
Patented Mar. 4, 1919.
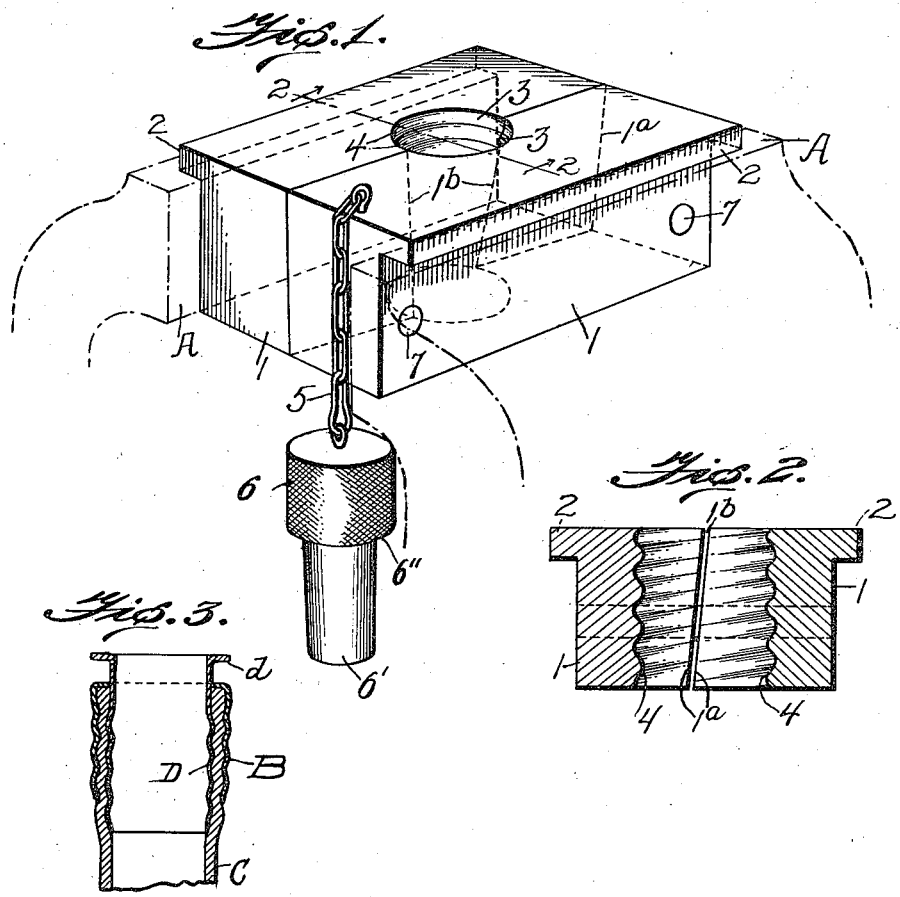
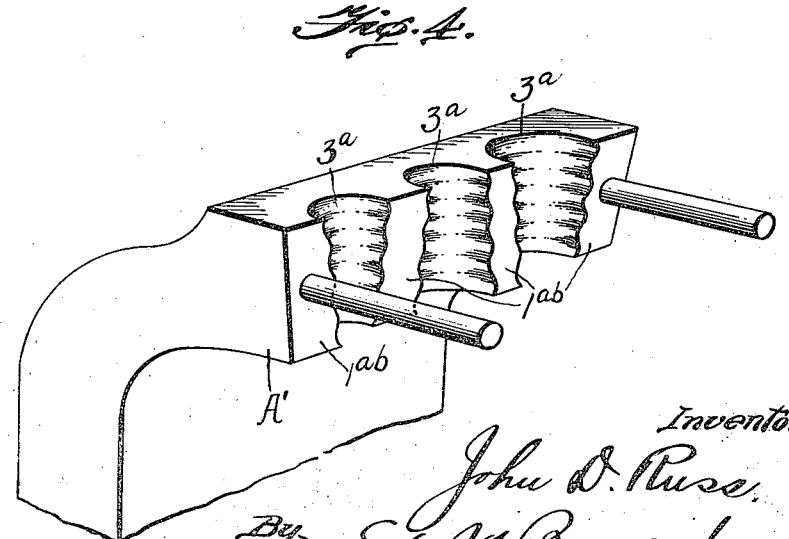
Inventor
John D. Russ,
By E.T. & J.F.W. Brandenburg
Attorneys

UNITED STATES PATENT OFFICE.

JOHN D. RUSS, OF SPENCER, WEST VIRGINIA.

DEVICE FOR SECURING COUPLINGS TO FLEXIBLE HOSE.

1,296,222.　　　　　Specification of Letters Patent.　　Patented Mar. 4, 1919.

Application filed June 27, 1918. Serial No. 242,229.

*To all whom it may concern:*

Be it known that I, JOHN D. RUSS, a citizen of the United States, residing at Spencer, in the county of Roane and State of West Virginia, have invented certain new and useful Improvements in Devices for Securing Couplings to Flexible Hose, of which the following is a specification.

The object of my invention is to provide an extremely simple device for quickly securing couplings on flexible hose for sprinkling lawns, etc.

In the accompanying drawing:

Figure 1 is a perspective view of my preferred form of device;

Fig. 2 is a sectional view on the line 2—2, Fig. 1;

Fig. 3 is a fragmentary sectional view of a hose with the couplings secured thereon by my device; and Fig. 4 is a view of a vise-jaw constructed so as to perform the work of the dies shown in Fig. 1.

Referring, now, to the drawing and, first, to Figs. 1 to 3 thereof:

1, 1 designate dies or matrices, which are blocks (preferably of steel), each carrying, at the top, a longitudinal, marginal flange 2 adapted to bear upon the top of a jaw A of a vise or press.

Each of the dies is provided with a complemental socket 3, semi-circular in cross section. When the dies are placed side by side, so that their adjacent sides abut, the sockets form an opening which is circular in cross section, as shown in Fig. 1.

It will be noted that the abutting faces 1ª of the dies, on opposite sides of the opening, are reversely inclined or slanted (as clearly shown in Fig. 1), for a purpose hereinafter appearing.

The wall of each socket 3 is provided with complemental corrugations 4, for a purpose hereinafter appearing.

One of the dies is provided with dowel-pins projecting from one of the sides thereof and slidable in corresponding holes 7, 7 in the other die; or the vise-jaws A may carry such pins engageable with corresponding openings in the dies. By this means, the dies may be slid toward or away from each other, being guided in their movement by the dowel-pins, so that the complemental sockets 3 may be brought into exact registry.

Preferably secured to one of the dies 1, as by a chain 5, is a metallic tool, comprising a preferably externally knurled head 6 and a pendent, cylindrical shank 6', the bottom of the head forming a shoulder 6'' surrounding the shank.

In operation, a thimble B, or outer ring or "binder," of soft metal, is slipped over the end of the flexible hose C. The tool-shank 6' is then slipped into the inner, corrugated ring or coupling D (of hard metal), having the top flange $d$, and said coupling forced into the end of the hose C. The end of the hose, with the rings B and D thereon, and the shank 6' in the coupling D, is then placed in the opening 3—3 of the dies or matrices 1—1, and the vise-jaws A, A closed so as to bring the adjacent faces 1ª of the dies into contact, thereby squeezing and compressing the outer soft-metal ring or thimble onto the end of the hose C. It will be understood, of course, that, before being operated upon by my device, the thimble B is uncorrugated, and that the corrugations therein are formed by the corrugations 4 of the die-opening 3—3 during the compressing operation.

It will be noted that the member 6—6' has a dual function. That is to say, it is used, first, as a tool to force the hard-metal, inner coupling D into the end of the flexible hose C, the tool-shank 6' being projected into the tubular, corrugated coupling D with the shoulder 6'' bearing against the flange $d$ of the coupling. After the coupling D has thus been forcibly seated in the end of the hose C by the tool, the latter performs its second function of bracing the coupling D against collapse during the operation of clamping the thimble B on the end of the hose C by means of the dies 1, 1 and the vise A.

When the walls 1ª of the dies are brought together, a "seam," as it were (see dotted lines 1ᵇ, 1ᵇ, in Fig. 1) extends longitudinally of the die-opening 3—3, on each side thereof, and these "seams" on opposite sides of the die-opening are reversely inclined, as shown by said dotted lines 1ᵇ, 1ᵇ in Fig. 1. This prevents the metal of the thimble B from kinking when being squeezed or compressed, in the dies, which kinking would be apt to take place if the "seams" were not inclined to the axis of the die-opening 3—3.

Referring, now, to Fig. 4, it will be seen that I have dispensed with the dies or matrices 1, 1, and have formed each vise-jaw, as A', with a plurality of corrugated sockets $3^a$, of differing semi-circular area in cross section. The portions $1^{ab}$, $1^{ab}$, $1^{ab}$, $1^{ab}$ of the face of each jaw are inclined or slanted, and each successive portion $1^{ab}$ is inclined reversely to the inclination of the preceding section or portion, as clearly shown. The other jaw (not shown) of the vise is similar to the jaw illustrated in Fig. 4, being also provided with portions which are complemental to the portions $1^{ab}$ of the jaw shown in Fig. 4 and with sockets complemental to the sockets $3^a$, whereby, when the jaws are closed, the portions $1^{ab}$ of one jaw abut the corresponding portions of the other jaw, and cross-sectionally circular openings are formed by the sockets $3^a$ of one jaw registering with the complemental sockets of the other jaw. With the device of Fig. 4, the tool 6—6' of Fig. 1 is, of course, used, and the operation of the vise-jaws in clamping the thimble B onto the hose C is the same as with the device of the preceding figures.

It will be obvious, of course, that the dies 1, 1 of Fig. 1 may be constructed with a plurality of openings or sockets (similar to the device shown in Fig. 4) of differing diameter. The purpose of a plurality of such sockets is to accommodate thimbles B of different diameters.

In the appended claims, I use the expression "dies" generically, as embracing either the members 1, 1 of Fig. 1, or the vise-jaws A' of Fig. 4, as, in my invention, such vise-jaws are, functionally, dies, since they perform the same function as the dies 1, 1 of Fig. 1.

Having thus fully described my invention, what I claim as new and desire to secure by Letters Patent is:

1. In a device for securing couplings on flexible hose, complemental dies provided each with a corrugated die-socket adapted to compress a soft-metal outer ring or "binder" onto the end of a flexible hose, and a cylindrical plug adapted to be inserted into the inner coupling-ring.

2. In a device for securing couplings on flexible hose, complemental dies adapted to be disposed side to side so as to abut, each of said dies being provided with a complemental die-socket, the portions of the abutting faces of said dies, on opposite sides of the die-opening, being reversely inclined.

3. In a device for securing couplings on flexible hose, complemental dies provided each with a corrugated die-socket adapted to compress a soft-metal outer ring or "binder" onto the end of a flexible hose, and a combined tool for forcing the inner coupling-ring into the end of the flexible hose and a plug for preventing collapse of said inner ring.

4. In a device for securing couplings on flexible hose, complemental dies provided each with a corrugated die-socket adapted to compress a soft-metal outer ring or "binder" onto the end of a flexible hose, and a combined tool for forcing the inner coupling-ring into the end of the hose and a plug for preventing collapse of said inner ring, said combined tool and plug having a head at one end thereof and a pendent, cylindrical shank.

In testimony whereof, I affix my signature in the presence of two witnesses.

JOHN D. RUSS.

Witnesses:
LEE GOFF,
GROVER F. HEDGES.